United States Patent
Zhou et al.

(10) Patent No.: US 9,774,390 B2
(45) Date of Patent: Sep. 26, 2017

(54) FIBER LINK RECOGNITION METHOD, DEVICE, AND SYSTEM

(71) Applicant: Huawei Technologies Co., Ltd., Shenzhen (CN)

(72) Inventors: Jinlin Zhou, Wuhan (CN); Shijun Wang, Wuhan (CN); Jun Zhao, Shenzhen (CN); Jingran Kang, Wuhan (CN); Xishe Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 20 days.

(21) Appl. No.: 15/049,531

(22) Filed: Feb. 22, 2016

(65) Prior Publication Data

US 2016/0173194 A1 Jun. 16, 2016

Related U.S. Application Data

(63) Continuation of application No. PCT/CN2014/075286, filed on Apr. 14, 2014.

(30) Foreign Application Priority Data

Oct. 25, 2013 (CN) .......................... 2013 1 0514261

(51) Int. Cl.
*H04B 10/071* (2013.01)
*G01N 21/00* (2006.01)

(52) U.S. Cl.
CPC .................................. *H04B 10/071* (2013.01)

(58) Field of Classification Search
CPC ..................................................... H04B 10/071
See application file for complete search history.

(56) References Cited

U.S. PATENT DOCUMENTS 6,310,702 B1 10/2001 Minami et al.
6,512,610 B1 1/2003 Minami et al.
(Continued)

FOREIGN PATENT DOCUMENTS

CN 1448695 A 10/2003
CN 102045125 A 5/2011
(Continued)

OTHER PUBLICATIONS

Partial English Translation and Abstract of Chinese Patent Application No. CN102594452, Jul. 28, 2016, 4 pages.
(Continued)

*Primary Examiner* — Tesfaldet Bocure
(74) *Attorney, Agent, or Firm* — Conley Rose, P.C.

(57) ABSTRACT

A fiber link recognition method, device, and system, to recognize different fiber links where the method includes sending, by a link recognition device, a first test optical signal, receiving a second test optical signal that is returned after the first test optical signal is sent to a connection port of a first optical node, acquiring a reflection peak of the second test optical signal on a fiber link, determining a port identifier of the connection port of the first optical node according to the reflection peak of the second test optical signal on the fiber link, and recognizing, the fiber link corresponding to the second test optical signal that is returned by the connection port of the first optical node. The method embodiment is used to recognize a fiber link.

9 Claims, 3 Drawing Sheets

(56) References Cited

U.S. PATENT DOCUMENTS

| | | |
|---|---|---|
| 2004/0196664 A1 | 10/2004 | Renard et al. |
| 2008/0267089 A1 | 10/2008 | Effenberger |
| 2009/0190921 A1 | 7/2009 | Nakajima et al. |
| 2009/0263123 A1 | 10/2009 | Zhu et al. |
| 2012/0045205 A1 | 2/2012 | Perron |
| 2012/0205446 A1 | 8/2012 | Wu et al. |
| 2012/0263458 A1 | 10/2012 | Wen et al. |
| 2014/0086573 A1 | 3/2014 | Zhang et al. |
| 2014/0146312 A1* | 5/2014 | Perron ............... G01M 11/3118 356/73.1 |
| 2016/0123837 A1* | 5/2016 | Chen .................... G01M 11/088 356/73.1 |
| 2016/0191152 A1* | 6/2016 | Soto ................... H04B 10/0775 398/16 |

FOREIGN PATENT DOCUMENTS

| | | |
|---|---|---|
| CN | 102067483 A | 5/2011 |
| CN | 102187603 A | 9/2011 |
| CN | 102244539 A | 11/2011 |
| CN | 102244541 A | 11/2011 |
| CN | 202103671 U | 1/2012 |
| CN | 102594452 A | 7/2012 |
| CN | 102801464 A | 11/2012 |
| CN | 102946273 A | 2/2013 |
| CN | 103002359 A | 3/2013 |
| CN | 103063242 A | 4/2013 |
| CN | 103166699 A | 6/2013 |
| EP | 1865438 A1 | 12/2007 |
| EP | 1524781 B1 | 11/2008 |
| EP | 2141832 A1 | 1/2010 |
| JP | 2006140730 A | 6/2006 |
| JP | 2012124686 A | 6/2012 |

OTHER PUBLICATIONS

Partial English Translation and Abstract of Chinese Patent Application No. CN102946273, Jul. 28, 2016, 6 pages.
Partial English Translation and Abstract of Chinese Patent Application No. CN103166699, Jul. 28, 2016, 7 pages.
Partial English Translation and Abstract of Chinese Patent Application No. CN202103671, Jul. 28, 2016, 10 pages.
Partial English Translation and Abstract of Chinese Patent Application No. CN103002359, Mar. 2, 2016, 7 pages.
Foreign Communication From A Counterpart Application, PCT Application No. PCT/CN2014/075286, English Translation of International Search Report dated Jul. 8, 2014, 2 pages.
Foreign Communication From A Counterpart Application, PCT Application No. PCT/CN2014/075286, English Translation of Written Opinion dated Jul. 8, 2014, 11 pages.
Foreign Communication From A Counterpart Application, Chinese Application No. 201310514261.0, Chinese Office Action dated Sep. 5, 2016, 7 pages.
Caviglia, F., et al., "Optical Maintenance," Optical Fiber Technology 5, Jan. 20, 1999, pp. 349-362.
Foreign Communication From A Counterpart Application, European Application No. 14856260.6, Extended European Search Report dated Apr. 24, 2017, 10 pages.

* cited by examiner

FIBER LINK RECOGNITION METHOD, DEVICE, AND SYSTEM

CROSS REFERENCE TO RELATED APPLICATIONS

This application is a continuation of International Application No. PCT/CN2014/075286, filed on Apr. 14, 2014, which claims priority to Chinese Patent Application No. 201310514261.0, filed on Oct. 25, 2013, both of which are hereby incorporated by reference in their entireties.

TECHNICAL FIELD

The present disclosure relates to the communications field, and in particular, to a fiber link recognition method, device, and system.

BACKGROUND

As fiber networks rapidly expand in terms of scale, passive optical network technologies gradually become a focus of optical access network technologies. A passive optical network includes an optical line terminal (OLT), an optical distribution network (ODN), and an optical network unit (ONU). The ODN includes multiple fiber links, and one or more levels of optical splitters and optical fibers, where an optical splitter is used to split an optical signal or combine optical signals. For example, an optical splitter can split an optical signal sent by an OLT into multiple signals, and transmit the multiple signals to different ONUs through fiber links.

To ensure normal transmission of an optical signal, it is usually required to test quality of an optical fiber and perform fault detection. In the prior art, a test optical signal is usually injected into a passive optical network using an optical time domain reflectometer (OTDR), a reflector is configured at an end (for example, a user end) of a fiber link, the test optical signal is reflected to the OTDR by the reflector, and the OTDR obtains a reflection peak using the received test optical signal, and estimates quality of an optical fiber and locates a fault using a characteristic of the reflection peak.

However, on a passive optical network, an optical splitter is usually configured to split a main fiber link into multiple fiber links, to split one optical signal into multiple branch optical signals, and transmit the multiple branch optical signals to corresponding user ends using the multiple fiber links. In this way, during fiber link maintenance, test signals corresponding to the multiple branch optical signals obtained after splitting are reflected on corresponding fiber links, and after the test signals pass through an optical splitter, the multiple fiber links are overlapped. As a result, the OTDR cannot distinguish and recognize a fiber link corresponding to each branch test optical signal, and consequently cannot determine quality of an optical fiber of a corresponding fiber link according to a reflection peak formed by a test optical signal, and if a fault occurs in a fiber link, the OTDR cannot determine the fiber link in which the fault occurs.

SUMMARY

Embodiments of the present disclosure provide a fiber link recognition method, device, and system, to recognize different fiber links.

To achieve the foregoing objective, the following technical solutions are used in the embodiments of the present disclosure.

According to a first aspect, a fiber link recognition method is provided, including sending, by a link recognition device, a first test optical signal, receiving a second test optical signal that is returned after the first test optical signal is sent to a connection port of a first optical node, acquiring a reflection peak of the second test optical signal on a fiber link, determining a port identifier of the connection port of the first optical node according to the reflection peak of the second test optical signal on the fiber link, where the reflection peak of the second test optical signal on the fiber link corresponds to the port identifier of the connection port of the first optical node, and recognizing, according to the port identifier of the connection port of the first optical node, the fiber link corresponding to the second test optical signal that is returned by the connection port of the first optical node.

In a first possible implementation manner of the first aspect, before the sending, by a link recognition device, a first test optical signal, the method further includes acquiring the port identifier of the connection port of the first optical node, sending the first test optical signal to the connection port of the first optical node according to the port identifier, and receiving the second test optical signal that is returned after the first test optical signal is transmitted to the connection port of the first optical node through the fiber link, acquiring the reflection peak of the second test optical signal on the fiber link, and establishing a correspondence between the port identifier and the reflection peak of the second test optical signal on the fiber link.

With reference to the first possible implementation manner of the first aspect, in a second possible implementation manner, the determining a port identifier of the connection port of the first optical node according to the reflection peak of the second test optical signal on the fiber link includes determining, according to the correspondence between the port identifier and the reflection peak, the port identifier corresponding to the reflection peak.

With reference to the first or second possible implementation manner of the first aspect, in a third possible implementation manner, the method further includes acquiring characteristic information of the first optical node, where the determining a correspondence between the port identifier and the reflection peak of the second test optical signal on the fiber link includes establishing a correspondence between the characteristic information of the first optical node and the port identifier, and the reflection peak of the second test optical signal on the fiber link.

According to a second aspect, a link recognition device is provided, comprising a processor and a non-transitory computer readable medium connected to the processor, and having stored thereon instructions that, when executed, cause the processor to send a first test optical signal, receive a second test optical signal that is returned after the first test optical signal is sent to a connection port of a first optical node, and acquire a reflection peak of the second test optical signal on a fiber link, and determine a port identifier of the connection port of the first optical node according to the reflection peak of the second test optical signal on the fiber link, and recognize, according to the port identifier of the connection port of the first optical node, the fiber link corresponding to the second test optical signal that is returned by the connection port of the first optical node, where the reflection peak of the second test optical signal on the fiber link corresponds to the port identifier of the connection port of the first optical node.

In a first possible implementation manner of the second aspect, the processor is further configured to acquire the port identifier of the connection port of the first optical node, send the first test optical signal to the connection port of the first optical node according to the port identifier, receive the second test optical signal that is returned after the first test optical signal is transmitted to the connection port of the first optical node through the fiber link, and acquire the reflection peak of the second test optical signal on the fiber link, and establish a correspondence between the port identifier and the reflection peak of the second test optical signal on the fiber link.

With reference to the first possible implementation manner of the second aspect, in a second possible implementation manner, the processor is further configured to determine, according to the correspondence between the port identifier and the reflection peak, the port identifier corresponding to the reflection peak.

With reference to the first possible implementation manner of the second aspect, in a third possible implementation manner, the processor is further configured to, before the correspondence between the port identifier and the reflection peak of the second test optical signal on the fiber link is determined, acquire characteristic information of the first optical node, establish a correspondence between the characteristic information of the first optical node and the port identifier, and the reflection peak of the second test optical signal on the fiber link.

According to a third aspect, a fiber link recognition system is provided, including a link recognition device, an optical node, and a test device, where the optical node includes a connection port, the link recognition device includes the link recognition device according to the second aspect. The connection port is configured to, after a first test optical signal sent by the link recognition device is received, return a second test optical signal, and the test device is configured to acquire a port identifier of the connection port, and send the port identifier of the connection port to the link recognition device.

In the used foregoing solutions, a link recognition device receives a second test optical signal that is returned by an optical node according to a first test optical signal, to obtain a reflection peak, and determines, according to a correspondence between the reflection peak and a port identifier of a connection port of the optical node, the connection port corresponding to the reflection peak, such that different fiber links are distinguished using the port identifier of the connection port, and different fiber links can be recognized.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
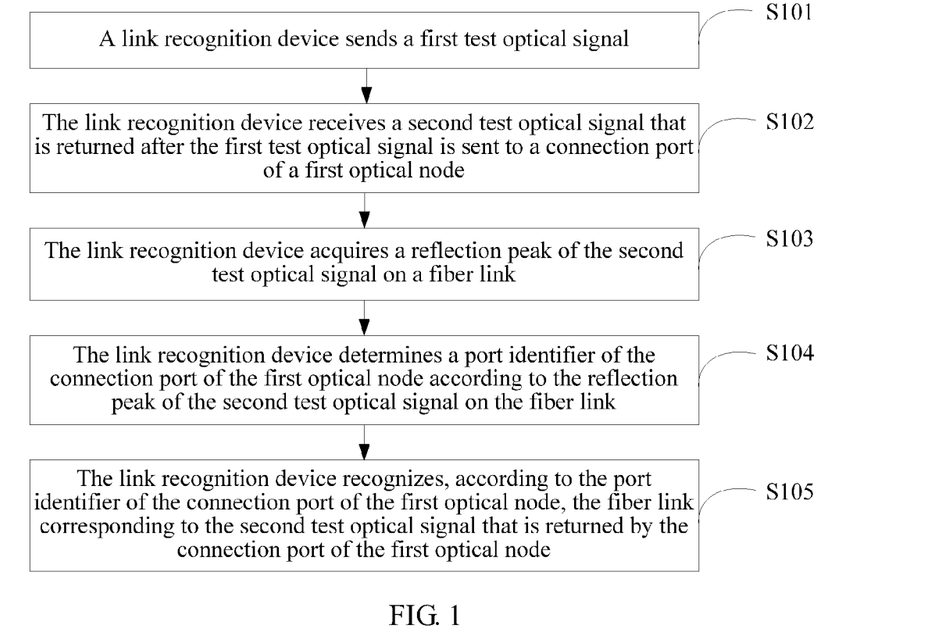
FIG. 1 is a schematic flowchart of a link recognition method according to an embodiment of the present disclosure.

An embodiment of the present disclosure provides a link recognition method. As shown in FIG. 1, the method is executed by a link recognition device, and the method includes the following steps.

Step S101: A link recognition device sends a first test optical signal.

When maintenance personnel need to maintain a fiber link established on a fiber network (for example, determine a connection status of each fiber link on the fiber network), the maintenance personnel trigger maintenance of the fiber network using the link recognition device, and the link recognition device sends the first test optical signal to connection ports of all optical nodes on the fiber network.

Step S102: The link recognition device receives a second test optical signal that is returned after the first test optical signal is sent to a connection port of a first optical node.

It should be noted that the terms "first", "second", and the like described in the following embodiments of the present disclosure do not intend to limit a sequence, and are merely for the purpose of convenient distinguishing.

After the link recognition device sends the first test optical signal to the connection port, because a reflector is configured in the connection port, the connection port can return the second test optical signal to the link recognition device using the reflector.

Step S103: The link recognition device acquires a reflection peak of the second test optical signal on a fiber link.

Exemplarily, the link recognition device may be an intelligent test unit (iTU) integrated with an OTDR, and after receiving the second test optical signal, the link recognition device obtains the reflection peak of the second test optical signal on the fiber link using the OTDR.

Step S104: The link recognition device determines a port identifier of the connection port of the first optical node according to the reflection peak of the second test optical signal on the fiber link.

The reflection peak of the second test optical signal on the fiber link corresponds to the port identifier of the connection port of the first optical node.

Step S105: The link recognition device recognizes, according to the port identifier of the connection port of the first optical node, the fiber link corresponding to the second test optical signal that is returned by the connection port of the first optical node.

After obtaining the reflection peak, the link recognition device can determine the connection port of the first optical node according to a correspondence between a reflection peak and a port identifier, and obtain a transfer time of the test optical signal and a waveform of the transmitted test optical signal according to the reflection peak. The link recognition device can determine a distance between the link recognition device and the connection port using the transfer time of the test optical signal. When maintenance personnel maintain a fiber link, the link recognition device can determine, using the distance, the connection port that returns the test optical signal, recognize different fiber links according to the connection port, and therefore can distinguish fiber links, and determine a connection status of the fiber link using the waveform of the test optical signal.

Exemplarily, the first optical node may be an optical splitter. The connection port of the first optical node may be a receive port, that is, a port that receives the test optical signal sent by the link recognition device, where a port identifier of the receive port may be a serial number of the port. The link recognition device may be an iTU integrated with an OTDR, where after acquiring a reflection peak, the iTU can determine a port serial number of a corresponding receive port according to the reflection peak using a correspondence, and recognize different fiber links using the receive port corresponding to the port serial number.

Figure 2:
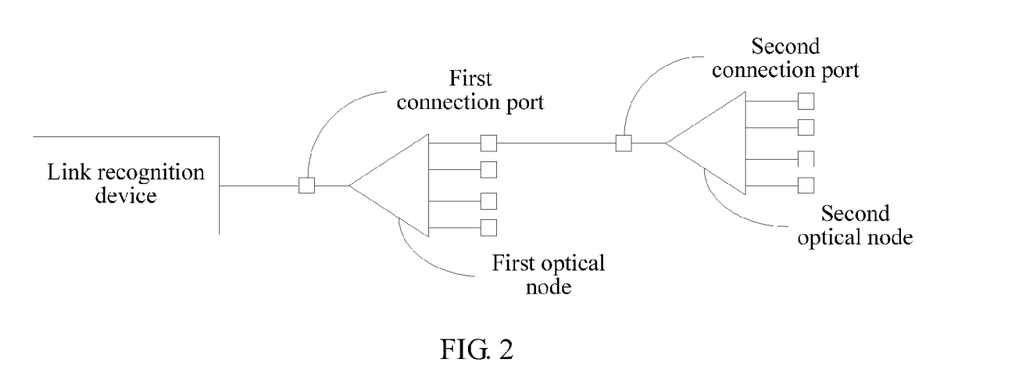
FIG. 2 is a schematic diagram of a link relationship according to an embodiment of the present disclosure.

Further, that the link recognition device recognizes different fiber links using the receive port corresponding to the port serial number is described with reference to FIG. 2. As shown in FIG. 2, the figure includes a link recognition device, a first optical node, a first connection port of the first optical node, a second optical node, and a second connection port. After obtaining a port identifier (for example, a port serial number), the link recognition device can determine a corresponding connection port according to the port identifier. When it is determined, according to the port identifier, that the corresponding connection port is an input port (that is, the first connection port) of the first optical node, the link recognition device determines that a corresponding fiber link is a fiber link from the link recognition device to the first optical node, and likewise, when it is determined, according to the port identifier, that the corresponding connection port is an input port (that is, the second connection port) of the second optical node, the link recognition device determines that a corresponding fiber link is a fiber link from the link recognition device to the second optical node. In this way, it is implemented that a fiber link is recognized using a connection port corresponding to a port identifier.

In a possible implementation manner of this embodiment of the present disclosure, a fault occurs in a fiber link, and the link recognition device can recognize, according to a correspondence between a reflection peak and a port identifier of a connection port of an optical node, the fiber link in which the fault occurs, which helps maintenance personnel conveniently rectify the fault in time, thereby improving working efficiency.

Furthermore, if a waveform of a reflection peak of a test optical signal that is returned by a receive port of the optical splitter and received by the link recognition device is the same as a waveform, stored when the link recognition device establishes a fiber link, of a reflection peak, it is determined that no fault occurs in the fiber link, or if a waveform of a reflection peak of a test optical signal that is returned by a receive port of the optical splitter and received by the link recognition device is different from a waveform, stored when the link recognition device establishes a fiber link, of a reflection peak, it is determined that a fault occurs in the fiber link.

Exemplarily, if an optical splitter A is installed on a fiber link and an optical splitter B is installed on a subsequent fiber link, and if a fault occurs in an optical fiber between the optical splitter A and the optical splitter B on the fiber links, during fiber link maintenance, after the link recognition device separately acquires a reflection peak A of a test optical signal returned by a receive port of the optical splitter A, and a reflection peak B of a test optical signal returned by a receive port of the optical splitter B, the link recognition device determines, by determining that a waveform of the reflection peak A is the same as a waveform of a reflection peak that is stored by the link recognition device and corresponds to a port identifier of the receive port of the optical splitter A, that no fault occurs in a fiber link from the link recognition device to the receive port of the optical splitter A, and determines, by determining that a waveform of the reflection peak B is different from a waveform of a reflection peak that is stored by the link recognition device and corresponds to a port identifier of the receive port of the optical splitter B, that a fault occurs in a fiber link from the link recognition device to the receive port of the optical splitter B. That is, it can be determined that a fault occurs in a fiber link between the optical splitter A and the optical splitter B.

In another possible implementation manner of this embodiment of the present disclosure, a fiber link is abnormally connected, and the link recognition device can determine a fiber link topological relationship according to an obtained port identifier, and determine the abnormally connected fiber link according to the obtained fiber link topological relationship and a fiber link topological relationship that is stored by the link recognition device, which helps maintenance personnel conveniently rectify the fault in time, thereby improving working efficiency.

The fiber link topological relationship indicates a connection relationship of optical nodes and fiber links on a fiber network.

Furthermore, if a fiber link is disconnected, the link recognition device cannot receive a reflection peak of a test optical signal on the fiber link, and if a fiber link is shortened or lengthened due to a damage to the fiber link, the link recognition device cannot determine, using a received reflection peak of a test optical signal on the fiber link, a port identifier corresponding to the fiber link. In this case, the link recognition device may acquire a reflection peak of a test optical signal on another fiber link, determine a corresponding port identifier according to the reflection peak, determine a fiber link topological relationship according to the obtained port identifier, and determine an abnormally connected fiber link according to the obtained fiber link topological relationship and a fiber link topological relationship that is stored by the link recognition device.

Exemplarily, after sending a test optical signal, the link recognition device can determine, after a test period (a time needed for the link recognition device to send the test optical signal and receive test optical signals that are returned by connection ports of all optical nodes), a corresponding port identifier according to a reflection peak of a test optical signal returned by a connection port of each optical node, and determine a fiber link topological relationship according to the port identifier. If the fiber link topological relationship obtained by the link recognition device is the same as a fiber link topological relationship that is stored by the link recognition device, the link recognition device determines that a fiber link is connected normally. If the link recognition device determines, after comparing the fiber link topological relationship obtained by the link recognition device and a fiber link topological relationship that is stored by the link recognition device, that a fiber link is absent in the fiber link topological relationship obtained by the link recognition device, the link recognition device determines that the fiber link is connected abnormally, where the fiber link absent in the fiber link topological relationship obtained by the link recognition device is the abnormally fiber link connected.

Further, the correspondence between the reflection peak obtained when the second test optical signal is transmitted on the fiber link, and the port identifier of the connection port of the first optical node is established by maintenance personnel during establishment of the fiber link. That is, when establishing a fiber link, maintenance personnel establish the correspondence, and recognize the fiber link using the correspondence in a subsequent process of maintaining the fiber link.

Furthermore, the link recognition device acquires the port identifier of the connection port of the first optical node, sends the first test optical signal to the connection port of the first optical node according to the port identifier, receives the second test optical signal that is returned after the first test optical signal is transmitted to the connection port of the first optical node through the fiber link, acquires the reflection peak of the second test optical signal on the fiber link, and establishes the correspondence between the port identifier and the reflection peak of the second test optical signal on the fiber link.

Further, the link recognition device determines, according to the correspondence between the port identifier and the reflection peak, the port identifier corresponding to the reflection peak.

Further, the link recognition device acquires the port identifier, sent by a test device, of the connection port of the first optical node.

Exemplarily, in a process of establishing a fiber link, the maintenance personnel need to connect an optical splitter to an optical node access device, to connect the optical splitter to a fiber network. After the optical splitter is connected to the optical node access device, the optical node access device acquires a port identifier of a connection port (that is, a receive port) and sends the port identifier to a test device. The test device acquires the port identifier of the receive port of the optical splitter and sends the port identifier to the link recognition device. After acquiring the port identifier sent by the test device, the link recognition device sends a first test optical signal to the receive port and receives a second test optical signal that is returned by the receive port according to the first test optical signal, and after acquiring the second test optical signal, the link recognition device obtains a reflection peak according to the second test optical signal. In this way, the link recognition device binds the obtained reflection peak to the previously received port identifier, to establish a correspondence between the reflection peak and the port identifier.

It should be noted that in a process of establishing a fiber link by the maintenance personnel, each time an optical node (for example, an optical splitter) is installed, the maintenance personnel need to establish a correspondence between a port identifier of a connection port of the optical node and a reflection peak that is obtained when a test optical signal is transmitted on a fiber link corresponding to the connection port, and save the correspondence, until the maintenance personnel finish installing all optical nodes, thereby establishing correspondences of connection ports of all optical nodes and reflection peaks. In this way, during fiber link maintenance, connection ports can be determined according to the correspondences using reflection peaks, to further recognize corresponding fiber links using the connection ports.

For example, if after acquiring a port identifier of a connection port of an optical splitter, the link recognition device receives a returned test optical signal after one microsecond, the link recognition device establishes a correspondence between a reflection peak of the test optical signal that is returned after one microsecond, and the port identifier, and if after acquiring a port identifier of a connection port of another optical splitter, the link recognition device receives a returned test optical signal after two microseconds, the link recognition device establishes a correspondence between a reflection peak of the test optical signal that is returned after two microseconds, and the port identifier. An exemplary description is merely provided herein, and does not constitute any limitation.

In addition, the optical node may also be a user terminal, and then the connection port is a connection port on the side of the user terminal. That is, when establishing a fiber link to a user end, the maintenance personnel may also bind, in the foregoing manner, a connection port on the side of the user terminal to a reflection peak obtained when a test optical signal is transmitted on a fiber link corresponding to the connection port, and details are not described again.

Further, before the correspondence between the port identifier and the reflection peak of the second test optical signal on the fiber link is determined, the link recognition device acquires characteristic information of the first optical node.

The characteristic information of the first optical node acquired by the link recognition device may be sent by a test device, and the characteristic information of the first optical node may be remark information such as a name and location of the first optical node. In this way, during fiber link maintenance, the maintenance personnel can learn name and location information of the first optical node according to the remark information.

Furthermore, before the correspondence between the port identifier and the reflection peak of the second test optical signal on the fiber link is determined, the link recognition device acquires the characteristic information of the first optical node, and establishes a correspondence between the characteristic information of the first optical node and the port identifier, and the reflection peak of the second test optical signal on the fiber link.

Exemplarily, the first optical node may be an optical splitter, the connection port of the first optical node may be a receive port of the optical splitter, and the link recognition device may be an iTU integrated with an OTDR. In a process of establishing a fiber link, the maintenance personnel need to connect the optical splitter to an optical node access device, to connect the optical splitter to a fiber network. After the optical splitter is connected to the optical node access device, the optical node access device acquires a port identifier of a connection port (that is, the receive port) and sends the port identifier to a test device. The test device acquires the port identifier of the receive port of the optical splitter and characteristic information of the optical splitter (where the characteristic information may be remark information entered by the maintenance personnel), and sends both the port identifier and the characteristic information to the iTU. After obtaining a reflection peak, the iTU binds the port identifier and the characteristic information to the reflection peak, to determine the correspondence between the characteristic information of the first optical node and the port identifier, and the reflection peak of the second test optical signal on the fiber link.

Further, after the link recognition device determines the correspondence between the port identifier and the reflection peak of the second test optical signal on the fiber link, if the link recognition device determines that a reflection peak of the second test optical signal on a fiber link corresponding to the first optical node overlaps with a reflection peak of the second test optical signal on a fiber link corresponding to the second optical node, the link recognition device sends an error message to the test device, such that the test device determines, according to the error message, that the fiber links are incorrectly configured.

If the link recognition device determines that the reflection peak of the second test optical signal on the fiber link corresponding to the first optical node overlaps with the reflection peak, saved in the link recognition device, of the second test optical signal on the fiber link corresponding to the second optical node, it indicates that a path length of the fiber link from the first optical node to the link recognition device is the same as that of the fiber link from the second optical node to the link recognition device. In this way, when the link recognition device simultaneously receives the reflection peak of the second test optical signal on the fiber link corresponding to the first optical node, and the reflection peak of the second test optical signal on the fiber link corresponding to the second optical node, the link recognition device cannot recognize corresponding connection ports according to the two overlapped reflection peaks (that two reflection peaks overlap indicates that the link recognition device simultaneously receives test optical signals corresponding to the two reflection peaks, that is, lengths of fiber links on which connection ports corresponding to the two reflection peaks are located are the same), and consequently cannot recognize corresponding fiber links. Therefore, a fiber link on which an optical node is installed needs to be lengthened, to avoid that as reflection peaks overlap, fiber links corresponding to connection ports cannot be recognized during subsequent fiber link maintenance.

For example, after maintenance personnel install an optical splitter, an iTU sends a first test optical signal to a connection port, and the iTU acquires a second test optical signal that is returned after the connection port receives the first test optical signal, and obtains a reflection peak according to the second test optical signal. If the iTU determines that the reflection peak overlaps with a saved reflection peak, a fiber link of the installed optical splitter needs to be lengthened. The iTU sends an error message to the test device to notify the test device of an incorrect configuration of the current optical splitter and an optical fiber length that needs to be compensated for, such that the maintenance personnel lengthen, according to the optical fiber length for compensation, a length of the fiber link corresponding to the optical splitter, to distinguish different fiber links, which is not limited in this embodiment of the present disclosure.

It should be noted that after the maintenance personnel lengthen, according to the optical fiber length for compensation, the length of the link corresponding to the optical node, the link recognition device sends a test optical signal to the connection port according to the port identifier, obtains a reflection peak according to a test optical signal returned by the connection port, and reestablishes a correspondence between the reflection peak and the port identifier. Refer to the foregoing process of establishing the correspondence between the reflection peak and the port identifier for details, which are not described herein again.

In the used foregoing method executed by a link recognition device, the link recognition device receives a second test optical signal that is returned by an optical node according to a first test optical signal, to obtain a reflection peak, and determines, according to a correspondence between the reflection peak and a port identifier of a connection port of the optical node, the connection port corresponding to the reflection peak, such that different fiber links are distinguished using the port identifier of the connection port, and different fiber links can be recognized.

Figure 3:
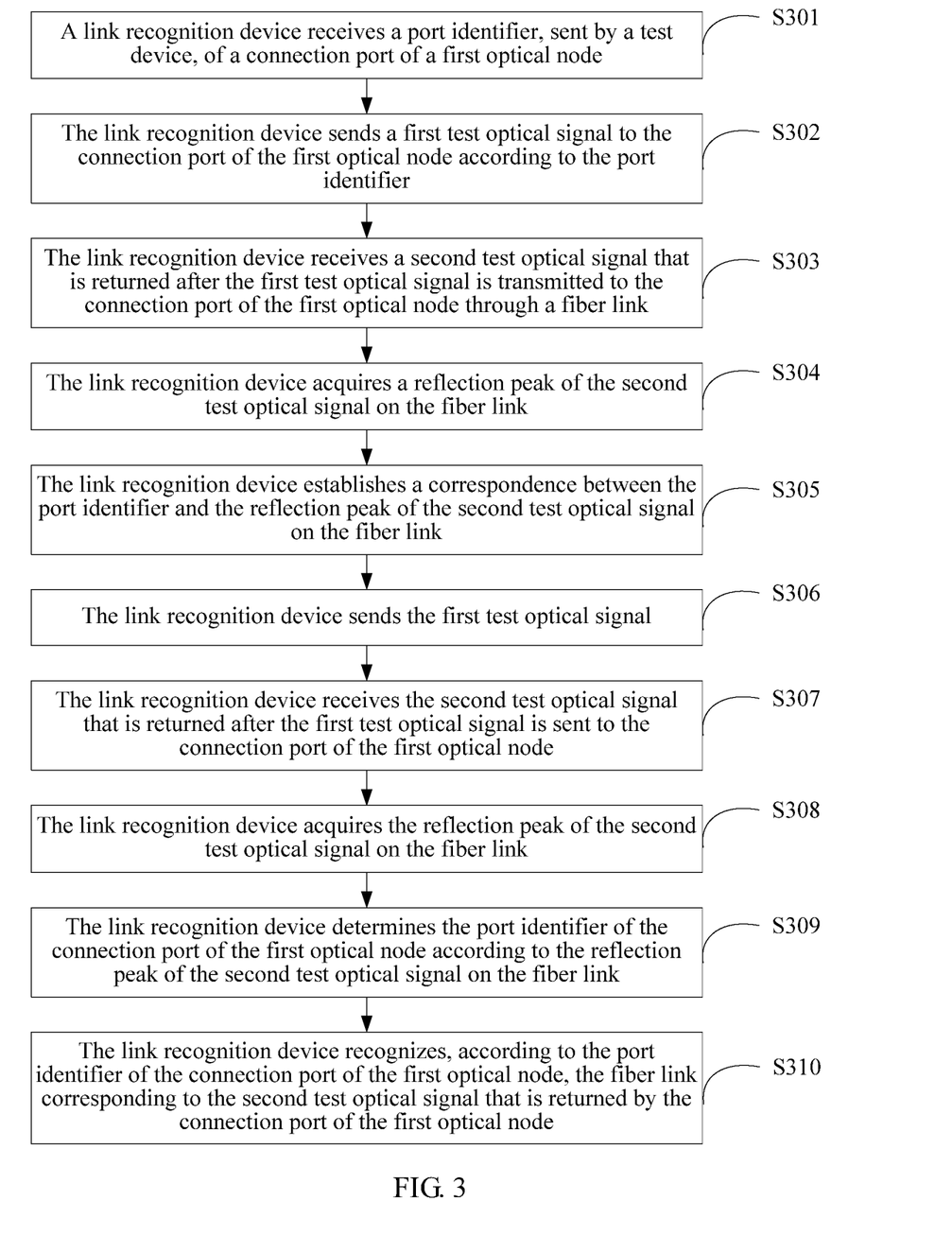
FIG. 3 is a schematic flowchart of another link recognition method according to an embodiment of the present disclosure.

An embodiment of the present disclosure provides a fiber link recognition method. As shown in FIG. 3, the method includes the following steps.

When a fiber link is established, maintenance personnel perform the following step S301 to step S305.

Step S301: A link recognition device receives a port identifier, sent by a test device, of a connection port of a first optical node.

The first optical node may be an optical splitter, and the connection port of the first optical node may be a receive port, where the receive port is a port through which the optical splitter receives a test optical signal.

Furthermore, in a process of establishing the fiber link, the maintenance personnel connect the test device and the connection port of the first optical node, and after acquiring the port identifier of the connection port, the test device sends the port identifier to the link recognition device.

It should be noted that the terms "first", "second", and the like described in the following embodiments of the present disclosure do not intend to limit a sequence, and are merely for the purpose of convenient distinguishing.

Step S302: The link recognition device sends a first test optical signal to the connection port of the first optical node according to the port identifier.

Step S303: The link recognition device receives a second test optical signal that is returned after the first test optical signal is transmitted to the connection port of the first optical node through the fiber link.

Step S304: The link recognition device acquires a reflection peak of the second test optical signal on the fiber link.

Step S305: The link recognition device establishes a correspondence between the port identifier and the reflection peak of the second test optical signal on the fiber link.

Further, the link recognition device acquires the port identifier of the connection port of the first optical node, sends the first test optical signal to the connection port of the first optical node according to the port identifier, receives the second test optical signal that is returned after the first test optical signal is transmitted to the connection port of the first optical node through the fiber link, obtains the reflection peak of the second test optical signal on the fiber link according to the second test optical signal, and determines the correspondence between the port identifier and the reflection peak of the second test optical signal on the fiber link.

Exemplarily, in a process of establishing a fiber link, the maintenance personnel need to connect an optical splitter to an optical node access device, to connect the optical splitter to a fiber network; after the optical splitter is connected to the optical node access device, the optical node access device acquires a port identifier of a connection port (that is, a receive port) and sends the port identifier to a test device. After acquiring the port identifier sent by the test device, the link recognition device sends a first test optical signal to the receive port and receives a second test optical signal that is returned by the receive port according to the first test optical signal, and after acquiring the second test optical signal, the link recognition device obtains a reflection peak according to the second test optical signal. In this way, the link recognition device binds the obtained reflection peak to the previously received port identifier, to establish a correspondence between the reflection peak and the port identifier.

It should be noted that in a process of establishing a fiber link by the maintenance personnel, each time an optical node (for example, an optical splitter) is installed, the maintenance personnel need to establish a correspondence between a port identifier of a connection port of the optical node and a reflection peak that is obtained when a test optical signal is transmitted on a fiber link corresponding to the connection port, and save the correspondence, until the maintenance personnel finish installing all optical nodes, thereby establishing correspondences of connection ports of all optical nodes and reflection peaks. In this way, during fiber link maintenance, connection ports can be determined according to the correspondences using reflection peaks, to further recognize corresponding fiber links using the connection ports.

For example, if after acquiring a port identifier of a connection port of an optical splitter, the link recognition device receives a returned test optical signal after one microsecond, the link recognition device establishes a correspondence between a reflection peak of the test optical signal that is returned after one microsecond, and the port identifier, and if after acquiring a port identifier of a connection port of another optical splitter, the link recognition device receives a returned test optical signal after two microseconds, the link recognition device establishes a correspondence between a reflection peak of the test optical signal that is returned after two microseconds, and the port identifier. An exemplary description is merely provided herein, and does not constitute any limitation.

In addition, the optical node may also be a user terminal, and then the connection port is a connection port on the side of the user terminal. That is, when establishing a fiber link to a user end, the maintenance personnel may also bind, in the foregoing manner, a connection port on the side of the user terminal to a reflection peak obtained when a test optical signal is transmitted on a fiber link corresponding to the connection port, and details are not described again.

Further, before the correspondence between the port identifier and the reflection peak of the second test optical signal on the fiber link is determined, the link recognition device acquires characteristic information of the first optical node.

The characteristic information of the first optical node acquired by the link recognition device may be sent by a test device, and the characteristic information of the first optical node may be remark information such as a name and location of the first optical node. In this way, during fiber link maintenance, the maintenance personnel can learn name and location information of the first optical node according to the remark information.

Furthermore, before the correspondence between the port identifier and the reflection peak of the second test optical signal on the fiber link is determined, the link recognition device acquires the characteristic information of the first optical node, and establishes a correspondence between the characteristic information of the first optical node and the port identifier, and the reflection peak of the second test optical signal on the fiber link.

Exemplarily, the first optical node may be an optical splitter, the connection port of the first optical node may be a receive port of the optical splitter, and the link recognition device may be an iTU integrated with an OTDR. In a process of establishing a fiber link, the maintenance personnel need to connect the optical splitter to an optical node access device, to connect the optical splitter to a fiber network. After the optical splitter is connected to the optical node access device, the optical node access device acquires a port identifier of a connection port (that is, the receive port) and sends the port identifier to a test device. The test device acquires the port identifier of the receive port of the optical splitter and characteristic information of the optical splitter (where the characteristic information may be remark information entered by the maintenance personnel), and sends both the port identifier and the characteristic information to the iTU. After obtaining a reflection peak, the iTU binds the port identifier and the characteristic information to the reflection peak, to determine the correspondence between the characteristic information of the first optical node and the port identifier, and the reflection peak of the second test optical signal on the fiber link.

Further, after the link recognition device determines the correspondence between the port identifier and the reflection peak of the second test optical signal on the fiber link, if the link recognition device determines that a reflection peak of the second test optical signal on a fiber link corresponding to the first optical node overlaps with a reflection peak of the second test optical signal on a fiber link corresponding to the second optical node, the link recognition device sends an error message to the test device, such that the test device determines, according to the error message, that the fiber links are incorrectly configured.

If the link recognition device determines that the reflection peak of the second test optical signal on the fiber link corresponding to the first optical node overlaps with the reflection peak, saved in the link recognition device, of the second test optical signal on the fiber link corresponding to the second optical node, it indicates that a path length of the fiber link from the first optical node to the link recognition device is the same as that of the fiber link from the second optical node to the link recognition device. In this way, when the link recognition device simultaneously receives the reflection peak of the second test optical signal on the fiber link corresponding to the first optical node, and the reflection peak of the second test optical signal on the fiber link corresponding to the second optical node, the link recognition device cannot recognize corresponding connection ports according to the two overlapped reflection peaks (that two reflection peaks overlap indicates that the link recognition device simultaneously receives test optical signals corresponding to the two reflection peaks, that is, lengths of fiber links on which connection ports corresponding to the two reflection peaks are located are the same), and consequently cannot recognize corresponding fiber links. Therefore, a fiber link on which an optical node is installed needs to be lengthened, to avoid that as reflection peaks overlap, fiber links corresponding to connection ports cannot be recognized during subsequent fiber link maintenance.

For example, after maintenance personnel install an optical splitter, an iTU sends a first test optical signal to a connection port, and the iTU acquires a second test optical signal that is returned after the connection port receives the first test optical signal, and obtains a reflection peak according to the second test optical signal. If the iTU determines that the reflection peak overlaps with a saved reflection peak, a fiber link of the installed optical splitter needs to be lengthened. The iTU sends an error message to the test device to notify the test device of an incorrect configuration of the current optical splitter and an optical fiber length that needs to be compensated for, such that the maintenance personnel lengthen, according to the optical fiber length for compensation, a length of the fiber link corresponding to the optical splitter, to distinguish different fiber links, which is not limited in this embodiment of the present disclosure.

It should be noted that after the maintenance personnel lengthen, according to the optical fiber length for compensation, the length of the link corresponding to the optical node, the link recognition device sends a test optical signal to the connection port according to the port identifier, obtains a reflection peak according to a test optical signal returned by the connection port, and reestablishes a correspondence between the reflection peak and the port identifier. Refer to the foregoing process of establishing the correspondence between the reflection peak and the port identifier in steps S301 to S305 for details, which are not described herein again.

After a fiber link is established, when maintaining the fiber link, the work personnel perform the following step S306 to step S310.

Step S306: The link recognition device sends the first test optical signal.

When the maintenance personnel need to maintain a fiber link established on a fiber network (for example, determine a connection status of each fiber link on the fiber network), the maintenance personnel trigger maintenance of a fiber network using the link recognition device, and the link recognition device sends the first test optical signal to connection ports of all optical nodes on the fiber network.

Step S307: The link recognition device receives the second test optical signal that is returned after the first test optical signal is sent to the connection port of the first optical node.

After the link recognition device sends the first test optical signal to the connection port, because a reflector is configured in the connection port, the connection port can return the second test optical signal to the link recognition device using the reflector.

Step S308: The link recognition device acquires the reflection peak of the second test optical signal on the fiber link.

Exemplarily, the link recognition device may be an iTU integrated with an OTDR, and after receiving the second test optical signal, the link recognition device obtains the reflection peak of the second test optical signal on the fiber link using the OTDR.

Step S309: The link recognition device determines the port identifier of the connection port of the first optical node according to the reflection peak of the second test optical signal on the fiber link.

The reflection peak of the second test optical signal on the fiber link corresponds to the port identifier of the connection port of the first optical node.

Furthermore, the port identifier corresponding to the reflection peak is determined according to a correspondence between the port identifier and the reflection peak.

Step S310: The link recognition device recognizes, according to the port identifier of the connection port of the first optical node, the fiber link corresponding to the second test optical signal that is returned by the connection port of the first optical node.

After obtaining the reflection peak, the link recognition device can determine the connection port of the first optical node according to a correspondence between a reflection peak and a port identifier, and obtain a transfer time of the test optical signal and a waveform of the transmitted test optical signal according to the reflection peak. The link recognition device can determine a distance between the link recognition device and the connection port using the transfer time of the test optical signal. When maintenance personnel maintain a fiber link, the link recognition device can determine, using the distance, the connection port that returns the test optical signal, recognize different fiber links according to the connection port, and therefore can distinguish fiber links, and determine a connection status of the fiber link using the waveform of the test optical signal.

Exemplarily, the first optical node may be an optical splitter. The connection port of the first optical node may be a receive port, that is, a port through which the optical splitter receives a to-be-split optical signal or outputs a to-be-combined optical signal, where port information of the receive port may be a serial number of the port, and the link recognition device may be an iTU integrated with an OTDR, where after acquiring a reflection peak, the iTU can determine a port serial number of a corresponding receive port according to the reflection peak using a correspondence, and recognize different fiber links using the port corresponding to the port serial number.

Further, for a process of determining a port serial number of a corresponding receive port according to the reflection peak, and recognizing different fiber links using the port corresponding to the port serial number, refer to the description of FIG. 2 in Embodiment 1 for details, which are not described herein again.

In a possible implementation manner of this embodiment of the present disclosure, a fault occurs in a fiber link, and the link recognition device can recognize, according to a correspondence between a reflection peak and a port identifier of a connection port of an optical node, the fiber link in which the fault occurs, which helps maintenance personnel conveniently rectify the fault in time, thereby improving working efficiency.

If a waveform of a reflection peak of a test optical signal that is returned by a receive port of the optical splitter and received by the link recognition device is the same as a waveform, stored when the link recognition device establishes a fiber link, of a reflection peak, it is determined that no fault occurs in the fiber link, or if a waveform of a reflection peak of a test optical signal that is returned by a receive port of the optical splitter and received by the link recognition device is different from a waveform, stored when the link recognition device establishes a fiber link, of a reflection peak, it is determined that a fault occurs in the fiber link.

Exemplarily, if an optical splitter A is installed on a fiber link and an optical splitter B is installed on a subsequent fiber link, and if a fault occurs in an optical fiber between the optical splitter A and the optical splitter B on the fiber links, during fiber link maintenance, after the link recognition device separately acquires a reflection peak A of a test optical signal returned by a receive port of the optical splitter A, and a reflection peak B of a test optical signal returned by a receive port of the optical splitter B, the link recognition device determines, by determining that a waveform of the reflection peak A is the same as a waveform of a reflection peak that is stored by the link recognition device and corresponds to a port identifier of the receive port of the optical splitter A, that no fault occurs in a fiber link from the link recognition device to the receive port of the optical splitter A, and determines, by determining that a waveform of the reflection peak B is different from a waveform of a reflection peak that is stored by the link recognition device and corresponds to a port identifier of the receive port of the optical splitter B, that a fault occurs in a fiber link from the link recognition device to the receive port of the optical splitter B. That is, it can be determined that a fault occurs in a fiber link between the optical splitter A and the optical splitter B.

In another possible implementation manner of this embodiment of the present disclosure, a fiber link is abnormally connected, and the link recognition device can determine a fiber link topological relationship according to an obtained port identifier, and determine the abnormally connected fiber link according to the obtained fiber link topological relationship and a fiber link topological relationship that is stored by the link recognition device, which helps maintenance personnel conveniently rectify the fault in time, thereby improving working efficiency.

The fiber link topological relationship indicates a connection relationship of optical nodes and fiber links on a fiber network.

If a fiber link is disconnected, the link recognition device cannot receive a reflection peak of a test optical signal on the fiber link, and if a fiber link is shortened or lengthened due to a damage to the fiber link, the link recognition device cannot determine, using a received reflection peak of a test optical signal on the fiber link, a port identifier corresponding to the fiber link. In this case, the link recognition device may acquire a reflection peak of a test optical signal on another fiber link, determine a corresponding port identifier according to the reflection peak, determine a fiber link topological relationship according to the obtained port identifier, and determine an abnormally connected fiber link according to the obtained fiber link topological relationship and a fiber link topological relationship that is stored by the link recognition device.

Exemplarily, after sending a test optical signal, the link recognition device can determine, after a test period (a time needed for the link recognition device to send the test optical signal and receive test optical signals that are returned by connection ports of all optical nodes), a corresponding port identifier according to a reflection peak of a test optical signal returned by a connection port of each optical node, and determine a fiber link topological relationship according to the port identifier. If the fiber link topological relationship obtained by the link recognition device is the same as a fiber link topological relationship that is stored by the link recognition device, the link recognition device determines that a fiber link is connected normally. If the link recognition device determines, after comparing the fiber link topological relationship obtained by the link recognition device and a fiber link topological relationship that is stored by the link recognition device, that a fiber link is absent in the fiber link topological relationship obtained by the link recognition device, the link recognition device determines that the fiber link is connected abnormally, where the fiber link absent in the fiber link topological relationship obtained by the link recognition device is the abnormally fiber link connected.

In the used foregoing link recognition method, a link recognition device receives a seventh test optical signal that is returned by an optical node according to a sixth test optical signal, to obtain a reflection peak, and determines, according to a correspondence between the reflection peak and a port identifier of a connection port of the optical node, the connection port corresponding to the reflection peak, such that different fiber links are distinguished using the port identifier of the connection port, and different fiber links can be recognized.

Figure 4:
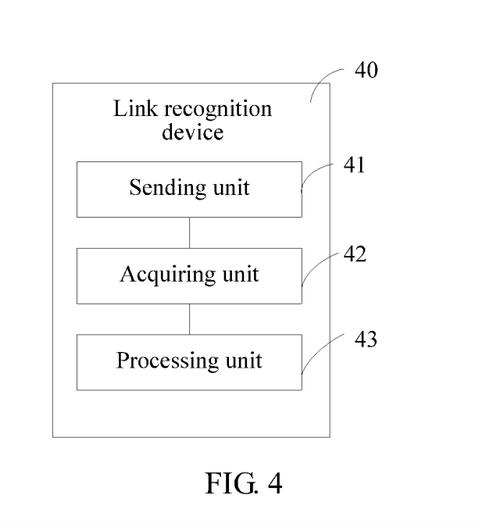
FIG. 4 is a schematic structural diagram of a link recognition device according to an embodiment of the present disclosure.

An embodiment of the present disclosure provides a link recognition device 40. As shown in FIG. 4, the link recognition device 40 includes a sending unit 41 configured to send a first test optical signal, an acquiring unit 42 configured to receive a second test optical signal that is returned after the first test optical signal is sent to a connection port of a first optical node, and acquire a reflection peak of the second test optical signal on a fiber link, and a processing unit 43 configured to determine a port identifier of the connection port of the first optical node according to the reflection peak of the second test optical signal on the fiber link, and recognize, according to the port identifier of the connection port of the first optical node, the fiber link corresponding to the second test optical signal that is returned by the connection port of the first optical node, where the reflection peak of the second test optical signal on the fiber link corresponds to the port identifier of the connection port of the first optical node.

Furthermore, the link recognition device determines, according to the correspondence between the port identifier and the reflection peak, the port identifier corresponding to the reflection peak.

Further, for a process of determining a port serial number of a corresponding receive port according to the reflection peak, and recognizing different fiber links using the port corresponding to the port serial number, refer to the description of FIG. 2 in Embodiment 1 for details, which are not described herein again.

When maintenance personnel need to maintain a fiber link established on a fiber network (for example, determine a connection status of each fiber link on the fiber network), the maintenance personnel trigger maintenance of a fiber network using the link recognition device, and the link recognition device sends the first test optical signal to connection ports of all optical nodes on the fiber network.

Further, after the link recognition device sends the first test optical signal to the connection port, because a reflector is configured in the connection port, the connection port can return the second test optical signal to the link recognition device using the reflector.

Further, after obtaining the reflection peak, the link recognition device can determine the connection port of the first optical node according to a correspondence between a reflection peak and a port identifier, and obtain a transfer time of the test optical signal and a waveform of the transmitted test optical signal according to the reflection peak. The link recognition device can determine a distance between the link recognition device and the connection port using the transfer time of the test optical signal. When maintenance personnel maintain a fiber link, the link recognition device can determine, using the distance, the connection port that returns the test optical signal, recognize different fiber links according to the connection port, and therefore can distinguish fiber links, and determine a connection status of the fiber link using the waveform of the test optical signal.

Exemplarily, the link recognition device may be an iTU in which an OTDR is integrated, the first optical node may be an optical splitter, and the connection port of the first optical node may be a receive port, that is, a port using which the optical splitter receives an optical signal that exists before splitting or outputs an optical signal obtained after combining, where port information of the receive port may be a serial number of the port. The iTU sends the first test optical signal, after receiving the second test optical signal that is returned after the first test optical signal is sent to the connection port of the first optical node, the iTU obtains the reflection peak of the second test optical signal on the fiber link using the OTDR, and after acquiring the reflection peak, the iTU can determine a port serial number of a corresponding receive port according to the reflection peak using a correspondence, and recognize different fiber links using the port corresponding to the port serial number.

In a possible implementation manner of this embodiment of the present disclosure, a fault occurs in a fiber link, and the link recognition device can recognize, according to a correspondence between a reflection peak and a port identifier of a connection port of an optical node, the fiber link in which the fault occurs, which helps maintenance personnel conveniently rectify the fault in time, thereby improving working efficiency.

If a waveform of a reflection peak of a test optical signal that is returned by a receive port of the optical splitter and received by the link recognition device is the same as a waveform, stored when the link recognition device establishes a fiber link, of a reflection peak, it is determined that no fault occurs in the fiber link, or if a waveform of a reflection peak of a test optical signal that is returned by a receive port of the optical splitter and received by the link recognition device is different from a waveform, stored when the link recognition device establishes a fiber link, of a reflection peak, it is determined that a fault occurs in the fiber link.

Exemplarily, if an optical splitter A is installed on a fiber link and an optical splitter B is installed on a subsequent fiber link, and if a fault occurs in an optical fiber between the optical splitter A and the optical splitter B on the fiber links, during fiber link maintenance, after the link recognition device separately acquires a reflection peak A of a test optical signal returned by a receive port of the optical splitter A, and a reflection peak B of a test optical signal returned by a receive port of the optical splitter B, the link recognition device determines, by determining that a waveform of the reflection peak A is the same as a waveform of a reflection peak that is stored by the link recognition device and corresponds to a port identifier of the receive port of the optical splitter A, that no fault occurs in a fiber link from the link recognition device to the receive port of the optical splitter A, and determines, by determining that a waveform of the reflection peak B is different from a waveform of a reflection peak that is stored by the link recognition device and corresponds to a port identifier of the receive port of the optical splitter B, that a fault occurs in a fiber link from the link recognition device to the receive port of the optical splitter B. That is, it can be determined that a fault occurs in a fiber link between the optical splitter A and the optical splitter B.

In another possible implementation manner of this embodiment of the present disclosure, a fiber link is abnormally connected, and the link recognition device can determine a fiber link topological relationship according to an obtained port identifier, and determine the abnormally connected fiber link according to the obtained fiber link topological relationship and a fiber link topological relationship that is stored by the link recognition device, which helps maintenance personnel conveniently rectify the fault in time, thereby improving working efficiency.

The fiber link topological relationship indicates a connection relationship of optical nodes and fiber links on a fiber network.

If a fiber link is disconnected, the link recognition device cannot receive a reflection peak of a test optical signal on the fiber link, and if a fiber link is shortened or lengthened due to a damage to the fiber link, the link recognition device cannot determine, using a received reflection peak of a test optical signal on the fiber link, a port identifier corresponding to the fiber link. In this case, the link recognition device may acquire a reflection peak of a test optical signal on another fiber link, determine a corresponding port identifier according to the reflection peak, determine a fiber link topological relationship according to the obtained port identifier, and determine an abnormally connected fiber link according to the obtained fiber link topological relationship and a fiber link topological relationship that is stored by the link recognition device.

Exemplarily, after sending a test optical signal, the link recognition device can determine, after a test period (a time needed for the link recognition device to send the test optical signal and receive test optical signals that are returned by connection ports of all optical nodes), a corresponding port identifier according to a reflection peak of a test optical signal returned by a connection port of each optical node, and determine a fiber link topological relationship according to the port identifier. If the fiber link topological relationship obtained by the link recognition device is the same as a fiber link topological relationship that is stored by the link recognition device, the link recognition device determines that a fiber link is connected normally. If the link recognition device determines, after comparing the fiber link topological relationship obtained by the link recognition device and a fiber link topological relationship that is stored by the link recognition device, that a fiber link is absent in the fiber link topological relationship obtained by the link recognition device, the link recognition device determines that the fiber link is connected abnormally, where the fiber link absent in the fiber link topological relationship obtained by the link recognition device is the abnormally fiber link connected.

Optionally, the acquiring unit 42 is further configured to, before the link recognition device sends the first test optical signal, acquire the port identifier of the connection port of the first optical node. The sending unit 41 is further configured to send the first test optical signal to the connection port of the first optical node according to the port identifier. The acquiring unit 42 is further configured to receive the second test optical signal that is returned after the first test optical signal is transmitted to the connection port of the first optical node through the fiber link, and acquire the reflection peak of the second test optical signal on the fiber link, and the processing unit 43 is further configured to establish a correspondence between the port identifier and the reflection peak of the second test optical signal on the fiber link.

The link recognition device acquires the port identifier of the connection port of the first optical node, sends the first test optical signal to the connection port of the first optical node according to the port identifier, receives the second test optical signal that is returned after the first test optical signal is transmitted to the connection port of the first optical node through the fiber link, obtains the reflection peak of the second test optical signal on the fiber link according to the second test optical signal, and determines the correspondence between the port identifier and the reflection peak of the second test optical signal on the fiber link.

It should be noted that in a process of establishing a fiber link by the maintenance personnel, each time an optical node (for example, an optical splitter) is installed, the maintenance personnel need to establish a correspondence between a port identifier of a connection port of the optical node and a reflection peak that is obtained when a test optical signal is transmitted on a fiber link corresponding to the connection port, and save the correspondence, until the maintenance personnel finish installing all optical nodes, thereby establishing correspondences of connection ports of all optical nodes and reflection peaks. In this way, during fiber link maintenance, connection ports can be determined according to the correspondences using reflection peaks, to further recognize corresponding fiber links using the connection ports.

For example, if after acquiring a port identifier of a connection port of an optical splitter, the link recognition device receives a returned test optical signal after one microsecond, the link recognition device establishes a correspondence between a reflection peak of the test optical signal that is returned after one microsecond, and the port identifier; and if after acquiring a port identifier of a connection port of another optical splitter, the link recognition device receives a returned test optical signal after two microseconds, the link recognition device establishes a correspondence between a reflection peak of the test optical signal that is returned after two microseconds, and the port identifier. An exemplary description is merely provided herein, and does not constitute any limitation.

In addition, the optical node may also be a user terminal, and then the connection port is a connection port on the side of the user terminal. That is, when establishing a fiber link to a user end, the maintenance personnel may also bind, in the foregoing manner, a connection port on the side of the user terminal to a reflection peak obtained when a test optical signal is transmitted on a fiber link corresponding to the connection port, and details are not described again.

Optionally, the acquiring unit 42 is further configured to, before the correspondence between the port identifier and the reflection peak of the second test optical signal on the fiber link is determined, acquire characteristic information of the first optical node.

The characteristic information of the first optical node acquired by the acquiring unit 42 may be sent by a test device, and the characteristic information of the first optical node may be remark information such as a name and location of the first optical node. In this way, during fiber link maintenance, the maintenance personnel can learn name and location information of the first optical node according to the remark information.

The processing unit 43 is further configured to establish a correspondence between the characteristic information of the first optical node and the port identifier, and the reflection peak of the second test optical signal on the fiber link.

Furthermore, before the correspondence between the port identifier and the reflection peak of the second test optical signal on the fiber link is determined, the link recognition device acquires the characteristic information of the first optical node, and establishes the correspondence between the characteristic information of the first optical node and the port identifier, and the reflection peak of the second test optical signal on the fiber link.

Exemplarily, the first optical node may be an optical splitter, the connection port of the first optical node may be a receive port of the optical splitter, and the link recognition device may be an iTU integrated with an OTDR. In a process of establishing a fiber link, the maintenance personnel need to connect the optical splitter to an optical node access device, to connect the optical splitter to a fiber network. After the optical splitter is connected to the optical node access device, the optical node access device acquires a port identifier of a connection port (that is, the receive port) and sends the port identifier to a test device. The test device acquires the port identifier of the receive port of the optical splitter and characteristic information of the optical splitter (where the characteristic information may be remark information entered by the maintenance personnel), and sends both the port identifier and the characteristic information to the iTU. After obtaining a reflection peak, the iTU binds the port identifier and the characteristic information to the reflection peak, to determine the correspondence between the characteristic information of the first optical node and the port identifier, and the reflection peak of the second test optical signal on the fiber link.

Optionally, the acquiring unit 42 is further configured to acquire the port identifier, sent by the test device, of the connection port of the first optical node.

Exemplarily, in a process of establishing a fiber link, the maintenance personnel need to connect an optical splitter to an optical node access device, to connect the optical splitter to a fiber network; after the optical splitter is connected to the optical node access device, the optical node access device acquires a port identifier of a connection port (that is, a receive port) and sends the port identifier to a test device. The test device acquires the port identifier of the receive port of the optical splitter and sends the port identifier to the link recognition device. After acquiring the port identifier sent by the test device, the link recognition device sends a first test optical signal to the receive port and receives a second test optical signal that is returned by the receive port according to the first test optical signal, and after acquiring the second test optical signal, the link recognition device obtains a reflection peak according to the second test optical signal. In this way, the link recognition device binds the obtained reflection peak to the previously received port identifier, to establish a correspondence between the reflection peak and the port identifier.

The sending unit 41 is further configured to after the correspondence between the port identifier and the reflection peak of the second test optical signal on the fiber link is determined, if it is determined that a reflection peak of the second test optical signal on a fiber link corresponding to the first optical node overlaps with a reflection peak of the second test optical signal on a fiber link corresponding to the second optical node, send an error message to the test device, such that the test device determines, according to the error message, that the fiber links are incorrectly configured.

If the link recognition device determines that the reflection peak of the second test optical signal on the fiber link corresponding to the first optical node overlaps with the reflection peak, saved in the link recognition device, of the second test optical signal on the fiber link corresponding to the second optical node, it indicates that a path length of the fiber link from the first optical node to the link recognition device is the same as that of the fiber link from the second optical node to the link recognition device. In this way, when the link recognition device simultaneously receives the reflection peak of the second test optical signal on the fiber link corresponding to the first optical node, and the reflection peak of the second test optical signal on the fiber link corresponding to the second optical node, the link recognition device cannot recognize corresponding connection ports according to the two overlapped reflection peaks (that two reflection peaks overlap indicates that the link recognition device simultaneously receives test optical signals corresponding to the two reflection peaks, that is, lengths of fiber links on which connection ports corresponding to the two reflection peaks are located are the same), and consequently cannot recognize corresponding fiber links. Therefore, a fiber link on which an optical node is installed needs to be lengthened, to avoid that as reflection peaks overlap, fiber links corresponding to connection ports cannot be recognized during subsequent fiber link maintenance.

For example, after maintenance personnel install an optical splitter, an iTU sends a first test optical signal to a connection port, and the iTU acquires a second test optical signal that is returned after the connection port receives the first test optical signal, and obtains a reflection peak according to the second test optical signal. If the iTU determines that the reflection peak overlaps with a saved reflection peak, a fiber link of the installed optical splitter needs to be lengthened. The iTU sends an error message to the test device to notify the test device of an incorrect configuration of the current optical splitter and an optical fiber length that needs to be compensated for, such that the maintenance personnel lengthen, according to the optical fiber length for compensation, a length of the fiber link corresponding to the optical splitter, to distinguish different fiber links, which is not limited in this embodiment of the present disclosure.

It should be noted that after the maintenance personnel lengthen, according to the optical fiber length for compensation, the length of the link corresponding to the optical node, the link recognition device sends a test optical signal to the connection port according to the port identifier, obtains a reflection peak according to a test optical signal returned by the connection port, and reestablishes a correspondence between the reflection peak and the port identifier. Refer to the foregoing process of establishing the correspondence between the reflection peak and the port identifier for details, which are not described herein again.

In the used foregoing link recognition device, the link recognition device receives a second test optical signal that is returned by an optical node according to a first test optical signal, to obtain a reflection peak, and determines, according to a correspondence between the reflection peak and a port identifier of a connection port of the optical node, the connection port corresponding to the reflection peak, such that different fiber links are distinguished using the port identifier of the connection port, and different fiber links can be recognized.

Figure 5:
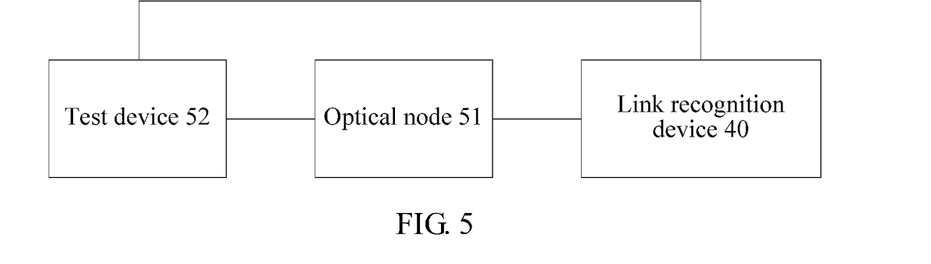
FIG. 5 is a diagram of a link recognition system according to an embodiment of the present disclosure.

An embodiment of the present disclosure provides a fiber link recognition system. As shown in FIG. 5, the system includes an optical node 51, a test device 52, and the link recognition device 40 shown in FIG. 4, where the optical node 51 includes a connection port. The connection port of the optical node 51 is configured to, after a first test optical signal sent by the link recognition device is received, return a second test optical signal. The test device 52 is configured to acquire a port identifier of the connection port, and send the port identifier of the connection port to the link recognition device.

Figure 6:
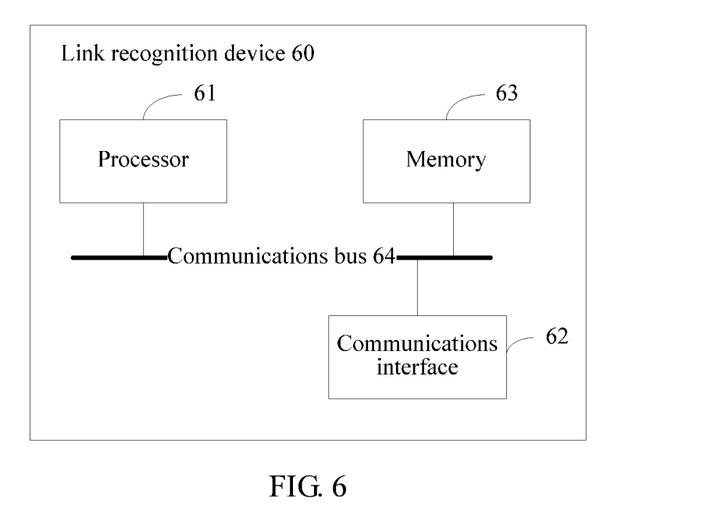
FIG. 6 is a schematic structural diagram of another link recognition device according to an embodiment of the present disclosure.

An embodiment of the present disclosure provides a link recognition device 60. As shown in FIG. 6, the link recognition device 60 includes a processor 61, a communications interface 62, a memory 63, and a communications bus 64, where the processor 61, the communications interface 62, and the memory 63 communicate with each other using the communications bus 64.

The processor 61 may be a central processing unit (CPU), an application specific integrated circuit (ASIC), or one or more integrated circuits configured to implement the embodiments of the present disclosure.

The memory 63 is configured to store program code, where the program code includes a computer operation instruction. The memory 63 may include a high-speed random access memory (RAM) memory, and may further include a non-volatile memory, for example, at least one magnetic disk storage.

The communications interface 62 is configured to implement connection and communication between these apparatuses.

The processor 61 executes program code, in order to send a first test optical signal, receive a second test optical signal that is returned after the first test optical signal is sent to a connection port of a first optical node, acquire a reflection peak of the second test optical signal on a fiber link, determine a port identifier of the connection port of the first optical node according to the reflection peak of the second test optical signal on the fiber link, and recognize, according to the port identifier of the connection port of the first optical node, the fiber link corresponding to the second test optical signal that is returned by the connection port of the first optical node, where the reflection peak of the second test optical signal on the fiber link corresponds to the port identifier of the connection port of the first optical node.

Optionally, the processor 61 is further configured to, before the link recognition device sends the first test optical signal, acquire the port identifier of the connection port of the first optical node, send the first test optical signal to the connection port of the first optical node according to the port identifier, receive the second test optical signal that is returned after the first test optical signal is transmitted to the connection port of the first optical node through the fiber link, acquire the reflection peak of the second test optical signal on the fiber link, and establish a correspondence between the port identifier and the reflection peak of the second test optical signal on the fiber link.

Optionally, the processor 61 is further configured to determine, according to the correspondence between the port identifier and the reflection peak, the port identifier corresponding to the reflection peak.

Optionally, the processor 61 is further configured to acquire characteristic information of the first optical node, and establish a correspondence between the characteristic information of the first optical node and the port identifier, and the reflection peak of the second test optical signal on the fiber link.

Through the description of the foregoing implementation manners, a person skilled in the art may clearly know that the present disclosure may be implemented by hardware, or implemented by firmware, or implemented by means of a combination thereof. When software is used for implementation, the foregoing functions may be stored in a computer readable medium or may be transmitted as one or more instructions or code in a computer readable medium. The computer readable medium includes a computer storage medium and a communications medium, where the communications medium includes any medium that facilitates transfer of a computer program from one place to another place, and the storage medium may be any available medium that can be accessed by a computer. The following is used as an example, but does not constitute any limitation. The computer readable medium may include a RAM, a read-only memory (ROM), an electrically erasable programmable read-only memory (EEPROM), a compact disc read-only memory (CD-ROM) or another optical disc storage, a magnetic disk storage medium or another magnetic storage device, or any other medium that can be configured to carry or store desired program code that is in a form of an instruction or a data structure, and that can be accessed by a computer. In addition, any connection may be properly used as the computer readable medium. For example, if software is transmitted from a website, a server, or another remote source using a coaxial cable, an optical fiber cable, a twisted pair cable, a digital subscriber line (DSL), or wireless technologies such as infrared, radio, and microwave, then the coaxial cable, fiber optical cable, twisted pair, or wireless technologies such as infrared, radio, and microwave are included in the definition of medium. Disk and disc used in the present disclosure includes a CD, a laser disc, an optical disc, a digital versatile disc (DVD), a floppy disk and a BLU-RAY disc, where disks usually reproduce data magnetically, while discs reproduce data optically using lasers. Combinations of the above should also be included within the protection scope of the computer readable medium.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A fiber link recognition method, comprising:
   sending, by a link recognition device, a first test optical signal;
   receiving a second test optical signal that is returned after the first test optical signal is sent to a connection port of a first optical node;
   acquiring a reflection peak of the second test optical signal on a fiber link;
   determining a port identifier of the connection port of the first optical node according to the reflection peak of the second test optical signal on the fiber link, wherein the reflection peak of the second test optical signal on the fiber link corresponds to the port identifier of the connection port of the first optical node; and
   recognizing, according to the port identifier of the connection port of the first optical node, the fiber link corresponding to the second test optical signal that is returned by the connection port of the first optical node.

2. The method according to claim 1, wherein before sending, by the link recognition device, the first test optical signal, the method further comprises:
   acquiring the port identifier of the connection port of the first optical node;
   sending the first test optical signal to the connection port of the first optical node according to the port identifier;
   receiving the second test optical signal that is returned after the first test optical signal is transmitted to the connection port of the first optical node through the fiber link;
   acquiring the reflection peak of the second test optical signal on the fiber link; and
   establishing a correspondence between the port identifier and the reflection peak of the second test optical signal on the fiber link.

3. The method according to claim 2, wherein determining the port identifier of the connection port of the first optical node according to the reflection peak of the second test optical signal on the fiber link comprises determining, according to the correspondence between the port identifier and the reflection peak, the port identifier corresponding to the reflection peak.

4. The method according to claim 2, further comprising:
   acquiring characteristic information of the first optical node;
   determining the correspondence between the port identifier and the reflection peak of the second test optical signal on the fiber link; and
   establishing a correspondence between the characteristic information of the first optical node and the port identifier, and the reflection peak of the second test optical signal on the fiber link.

5. A link recognition device, comprising:
   a processor; and
   a non-transitory computer readable medium connected to the processor,
   wherein the processor is configured to:
     send a first test optical signal;
     receive a second test optical signal that is returned after the first test optical signal is sent to a connection port of a first optical node;
     acquire a reflection peak of the second test optical signal on a fiber link;
     determine a port identifier of the connection port of the first optical node according to the reflection peak of the second test optical signal on the fiber link; and
     recognize, according to the port identifier of the connection port of the first optical node, the fiber link corresponding to the second test optical signal that is returned by the connection port of the first optical node, wherein the reflection peak of the second test optical signal on the fiber link corresponds to the port identifier of the connection port of the first optical node.

6. The device according to claim 5, wherein the processor is further configured to:
   acquire the port identifier of the connection port of the first optical node;
   send the first test optical signal to the connection port of the first optical node according to the port identifier;
   receive the second test optical signal that is returned after the first test optical signal is transmitted to the connection port of the first optical node through the fiber link;
   acquire the reflection peak of the second test optical signal on the fiber link; and
   establish a correspondence between the port identifier and the reflection peak of the second test optical signal on the fiber link.

7. The device according to claim 6, wherein the processor is further configured to determine, according to the correspondence between the port identifier and the reflection peak, the port identifier corresponding to the reflection peak.

8. The device according to claim 6, wherein the processor is further configured to:
   acquire characteristic information of the first optical node; and
   establish a correspondence between the characteristic information of the first optical node and the port identifier, and the reflection peak of the second test optical signal on the fiber link.

9. A fiber link recognition system, comprising:
   a link recognition device;
   a first optical node; and
   a test device,
   wherein the link recognition device, the optical node and the test device are connected to each other,
   wherein the first optical node comprises a connection port,
   wherein the link recognition device is configured to:
     send a first test optical signal;
     receive a second test optical signal that is returned after the first test optical signal is sent to the connection port of the first optical node;
     acquire a reflection peak of the second test optical signal on a fiber link;
     determine a port identifier of the connection port of the first optical node according to the reflection peak of the second test optical signal on the fiber link, wherein the reflection peak of the second test optical signal on the fiber link corresponds to the port identifier of the connection port of the first optical node; and recognize the fiber link corresponding to the second test optical signal that is returned by the connection port of the first optical node, wherein the connection port is configured to return the second test optical signal after the first test optical signal sent by the link recognition device is received, and wherein the test device is configured to:

acquire the port identifier of the connection port; and send the port identifier of the connection port to the link recognition device.

* * * * *